United States Patent [19]

Kilts

[11] Patent Number: 5,104,137
[45] Date of Patent: Apr. 14, 1992

[54] APPARATUS AND METHOD FOR PROVIDING ROTARY POWER

[76] Inventor: Gary R. Kilts, 2726 Dunham, Wichita, Kans. 67216

[21] Appl. No.: 604,215

[22] Filed: Oct. 29, 1990

[51] Int. Cl.⁵ .............................................. B62M 1/04
[52] U.S. Cl. .................................. 280/255; 280/253; 280/257
[58] Field of Search ............... 280/210, 230, 241, 253, 280/257, 258, 260, 261, 255; 74/578

[56] References Cited

U.S. PATENT DOCUMENTS

| 556,802 | 3/1896 | Boyle | 280/241 |
|---|---|---|---|
| 584,200 | 6/1897 | Wheatley | 280/255 |
| 599,106 | 2/1898 | Löb et al. | 280/257 |
| 1,499,909 | 7/1924 | Church et al. | 74/578 |
| 2,283,506 | 5/1942 | Moncada | 74/136 |
| 3,204,475 | 9/1965 | Pierce | 74/575 |
| 3,820,820 | 6/1974 | Kutz | 280/261 |
| 4,173,154 | 11/1979 | Sawmiller et al. | 280/261 |
| 4,515,382 | 5/1985 | Boese | 74/578 |

FOREIGN PATENT DOCUMENTS

| 667140 | 9/1988 | Switzerland | 280/257 |
|---|---|---|---|
| 81/02556 | 9/1981 | World Int. Prop. O. | 280/261 |

Primary Examiner—Mitchell J. Hill
Attorney, Agent, or Firm—John Wade Carpenter

[57] ABSTRACT

An apparatus, more particularly a bicycle, which includes a device or assembly for providing rotary power. The device or assembly comprises a frame; a shaft rotatably mounted to the frame; and a first and second pawl member connected to the shaft. A first sprocket is coupled to the first pawl member for ratcheting therewith and for rotating the shaft in a predetermined direction; and a second sprocket is coupled to the second pawl for also ratcheting therewith and for rotating the shaft in the predetermined direction. A first and second idler sprocket is rotatably supported by the frame such that a first and second endless chain respectively is entrained over the first and second idler sprockets and the first and second sprockets. A drive sprocket is connected to the shaft. An endless drive chain in entrained to the drive sprocket and is coupled to a rear wheel of a bicycle. A first and second pedal support and guide assembly is supported by the frame, and a first and second pedal member is respectively slideably engaged to the first and second pedal support and guide assembly. A method for providing rotary power to a device comprising coupling a first and a second sprocket to a shaft for rotating the same in a predetermined direction, and securing a drive sprocket to the shaft. The method further comprises rotating the first and second sprocket intermittently and alternatively clockwise and counterclockwise to rotate the shaft and drive sprocket in a predetermined direction such that the drive sprocket can provide rotary power.

14 Claims, 11 Drawing Sheets

APPARATUS AND METHOD FOR PROVIDING ROTARY POWER

FIELD OF THE INVENTION

This invention is related to an apparatus and method for providing rotary power. More specifically, the present invention relates to a bicycle which has a pedal, and a pedal support and guide assembly that are operable to provide a continuous power force or stroke to the rear wheel of the bicycle to propel the same.

DESCRIPTION OF THE PRIOR ART

A patentability investigation was conducted and the following U.S. Pat. Nos. by were discovered:

No. 584,200 entitled "BICYCLE" to Joseph Wheatley;
No. 611,429 entitled "BICYCLE" to Alexander W. Hall,
No. 644,805 entitled "CLUTCH" to Joseph A. McGee;
No. 666,068 entitled "DRIVING AND BRAKING MECHANISM FOR BICYCLES" to Edvard Sarvela;
No. 849,342 entitled "BICYCLE" to Thomas Swinback;
No. 2,283,506 entitled "MOTION TRANSFORMING MECHANISM" to Ramon A. Moncada;
No. 3,862,579 entitled "PEDAL MECHANISM" to Howard R. Roberts; and
No. 3,954,282 entitled "VARIABLE SPEED RECIPROCATING LEVER DRIVE MECHANISM" to Douglas W. Hege.

None of the foregoing prior art provides the improved features of the apparatus and method of the present invention.

SUMMARY OF THE INVENTION

The present invention accomplishes its desired objects by broadly providing an apparatus for furnishing rotary power to move a device comprising:

(a) a frame;
(b) a shaft means rotatably supported by the frame for being rotated in a predetermined direction;
(c) a first sprocket coupled to the shaft means for rotating the same in the predetermined direction;
(d) a second sprocket coupled to the shaft means for rotating the same in the predetermined direction;
(e) a first means, engaged to the first sprocket, for providing a support to an imposed force for rotating the first sprocket intermittently and alternatively clockwise and counterclockwise;
(f) a second means, engaged to the second sprocket, for providing a support to an imposed force for rotating the second sprocket intermittently and alternatively clockwise and counterclockwise; and
(g) at least one planetary gear member rotatably engaged to the first sprocket and to the second sprocket and supported by the frame such that rotary force can be transferred from the first sprocket to the second sprocket and vice versa when the first sprocket and the second sprocket are rotating the shaft means in the predetermined direction.

The present invention further accomplishes its desired objects by more specifically providing a bicycle comprising:

(a) a frame rotatably supported by a front wheel and a rear wheel;
(b) a shaft rotatably mounted to the frame;
(c) a first pawl member connected to the shaft;
(d) a second pawl member connected to the shaft;
(e) a first sprocket coupled to the first pawl member for ratcheting therewith and for rotating the shaft in a predetermined direction;
(f) a second sprocket coupled to the second pawl member for ratcheting therewith and for rotating the shaft in the predetermined direction;
(g) a first idler sprocket rotatably supported by the frame;
(h) a second idler sprocket rotatably supported by the frame;
(i) a first endless chain entrained over the first sprocket and the first idler sprocket;
(j) a second endless chain entrained over the second sprocket and the second idler sprocket;
(k) a drive sprocket connected to the shaft;
(l) an endless drive chain entrained to the drive sprocket and coupled to the rear wheel;
(m) a first pedal support and guide assembly supported by the frame;
(n) a second pedal support and guide assembly supported by the frame;
(o) a first pedal member slidably engaged to the first pedal support and guide assembly and coupled to the first endless chain; and
(p) a second pedal member slidably engaged to the second pedal support and guide assembly and coupled to the second endless chain.

The present invention yet further accomplishes its desired objects by broadly providing a method for providing rotary power to a device comprising the steps of:

(a) providing a frame having a shaft rotatably secured thereto for being rotated in a predetermined direction;
(b) securing a drive sprocket to the shaft;
(c) coupling a first sprocket to the shaft for rotating the same in a predetermined direction;
(d) coupling a second sprocket to the shaft for rotating the same in the predetermined direction;
(e) rotating the first sprocket intermittently and alternatively clockwise and counterclockwise to rotate the shaft and the drive sprocket in the predetermined direction such that the drive sprocket can provide rotary power; and
(f) rotating the second sprocket intermittently and alternatively clockwise and counterclockwise to rotate the shaft and the drive sprocket in the predetermined direction such that the drive sprocket can provide rotary power.

It is therefore an object of the present invention to provide an apparatus for providing and/or furnishing rotary power to move a device.

It is another object of the present invention to provide a bicycle.

It is yet another object of the present invention to provide a method for furnishing and/or providing rotary power to a device, such as a bicycle.

These, together with the various ancillary objects and features which will become apparent to those skilled in the art as the following description proceeds, are attained by this novel apparatus, bicycle and method, a preferred embodiment being shown with reference to the accompanying drawings, by way of example only, wherein:

DETAILED DESCRIPTION OF THE INVENTION

Figure 1:
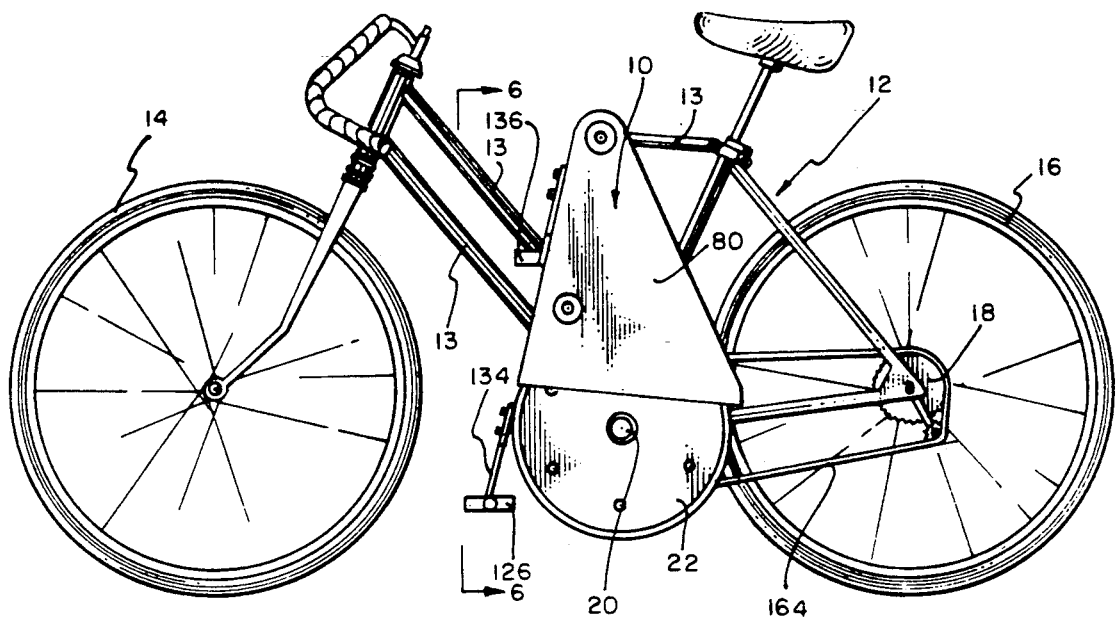
FIG. 1 is a side elevational view of the bicycle of this invention.
Figure 2:
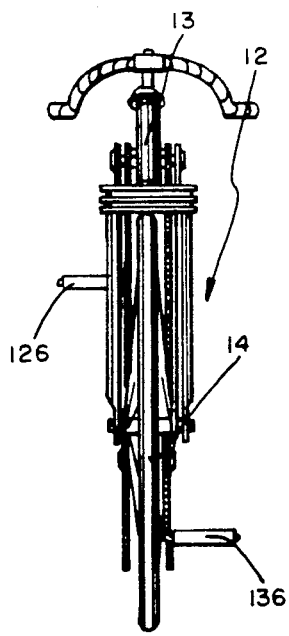
FIG. 2 is a front elevational view of the bicycle of FIG. 1.
Figure 3:
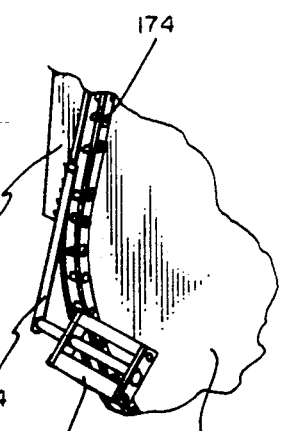
FIG. 3 is a perspective view of a pedal bracket having a pedal member attached thereto with an endless chain secured to the pedal bracket and entrained to or over a sprocket.

Referring in detail now to the drawings, wherein similar parts of the invention are identified by like reference, there is seen an apparatus, generally illustrated as 10, for providing rotary power to move a device, such as a bicycle 12, having the apparatus 10 secured thereto. More specifically, the bicycle 12 has a frame 13. The bicycle 12 is a conventional bicycle (or two wheel vehicle) having and being supported by a front wheel 14 and rear wheel 16. The rear wheel 16 is coupled to rear sprocket 18 such that when the rear sprocket 18 is being rotated and driven, the rear wheel 16 turns to move the bicycle 12.

Figure 14:
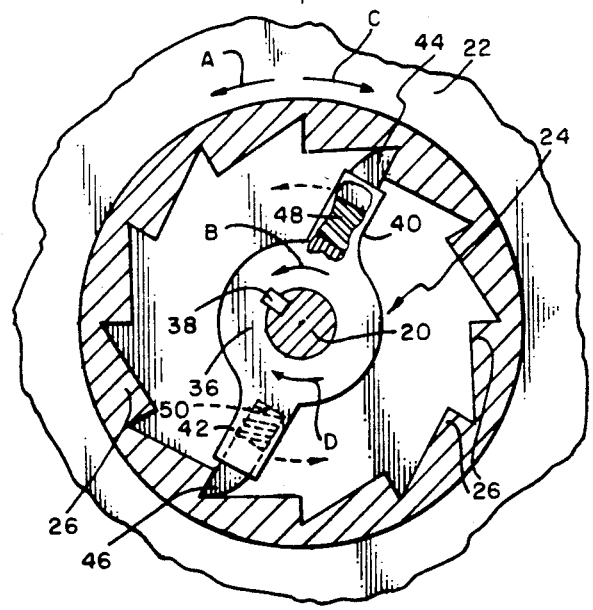
FIG. 14 is a partial vertical view taken in direction of arrows and along the plane of line 14—14 in FIG. 6.
Figure 16:
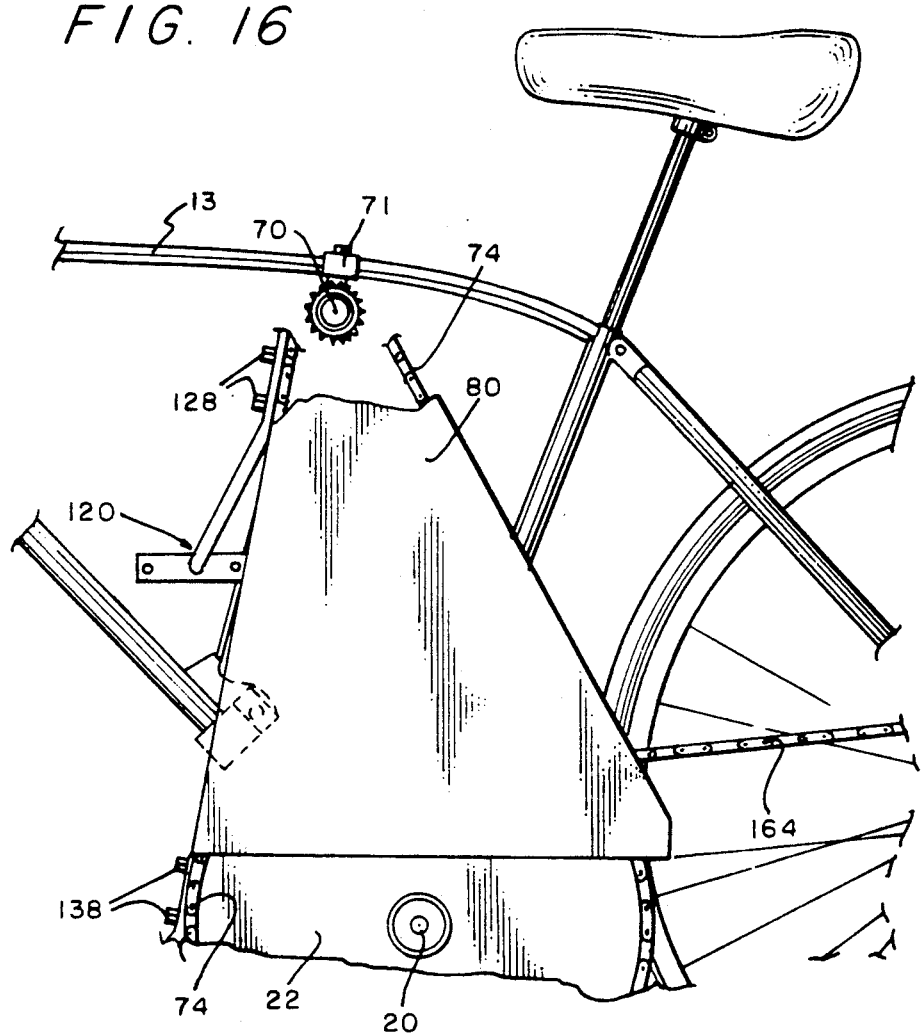
FIG. 16 is another side elevational view of the bicycle and more particularly disclosing one of the idler sprocket members.

The apparatus 10 broadly comprises a shaft 20 rotatably secured to and supported by the frame 13; and a first (or left) sprocket 22 coupled to the shaft 20 by a pawl member, generally illustrated as 24, which is keyed to or connected to the shaft 20 illustrated as 24, which is keyed to or connected to the shaft 20 (See FIG. 14). More particularly, the sprocket 22 has teeth 26 which is firmly engaged by the pawl member 24 when the sprocket 22 is moved or rotated counterclockwise (i.e. the power stroke in direction of the arrow A in FIG. 14) with respect to the view in FIG. 14, in order to move and rotate the pawl member 24 and the shaft 20 also counterclockwise and in direction of the arrow B in FIG. 14. When the sprocket 22 is moved clockwise and in direction of the arrow C in FIG. 14 (as will be more particularly described below), the pawl member 24 ratchets over the teeth 26 in order to release or prevent the shaft 20 from being rotated clockwise and in direction of the arrow D in FIG. 14. In a preferred embodiment for the invention, the shaft 20 is only rotated in a single direction, which is the direction of the arrow B in FIG. 14.

Figure 4:
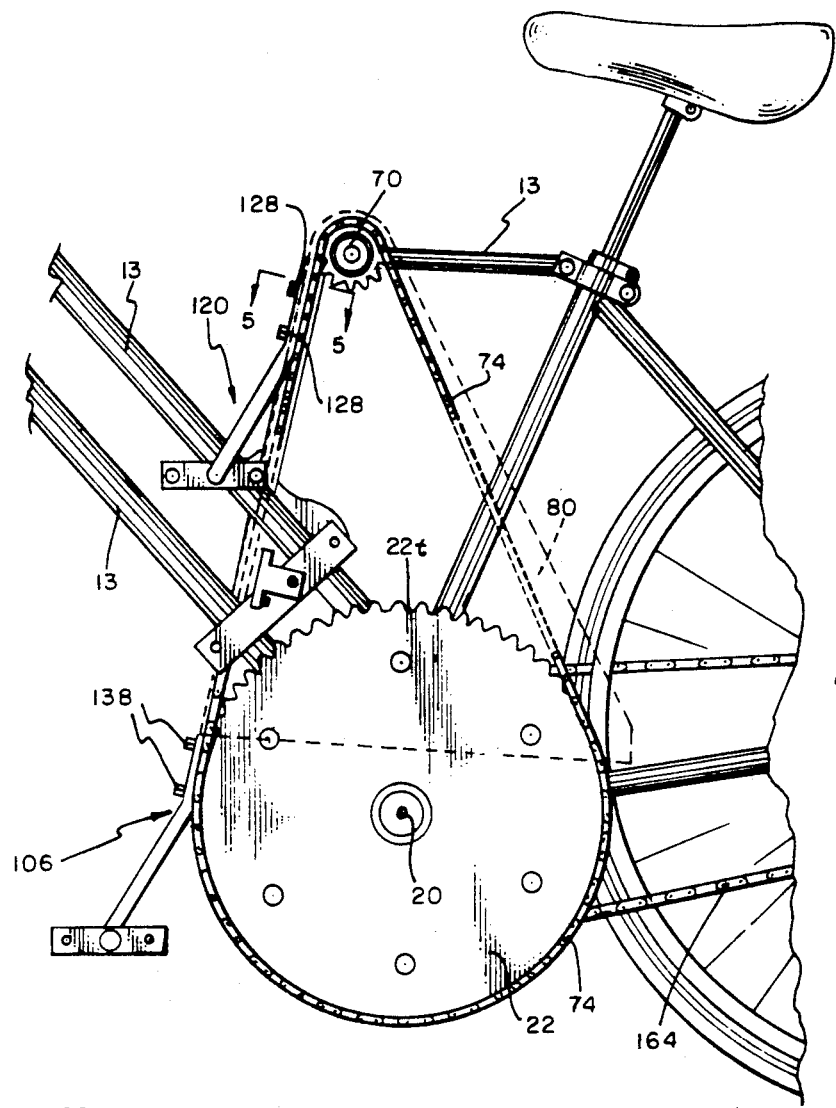
FIG. 4 is an enlarged partial side elevational view of the pedal members each secured to an endless chain and entrained over a sprocket and an idler.
Figure 5:
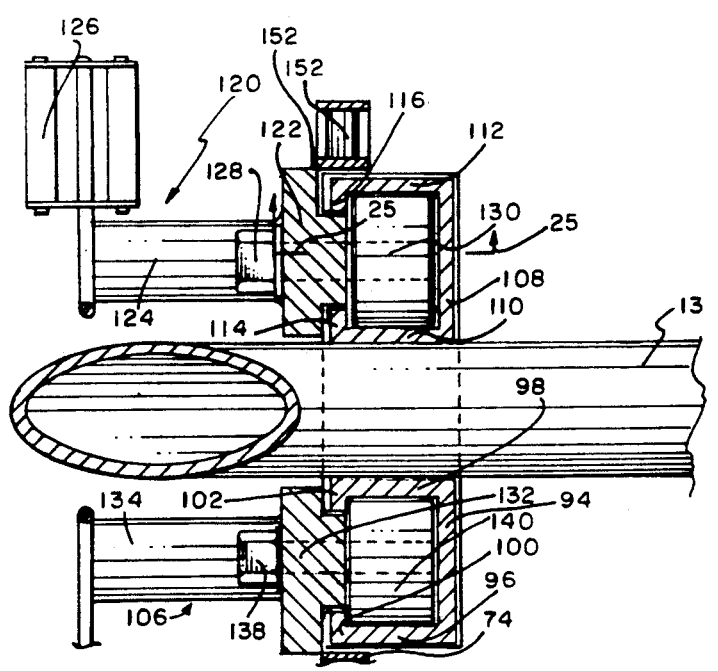
FIG. 5 is an enlarged partial horizontal sectional view taken in direction of the arrows and along the plane of line 5—5 in FIG. 4.

As best shown in FIG. 4, the first sprocket 22 has a periphery having a structure defining a plurality of teeth 22t.

Figures 6, 7, 8:
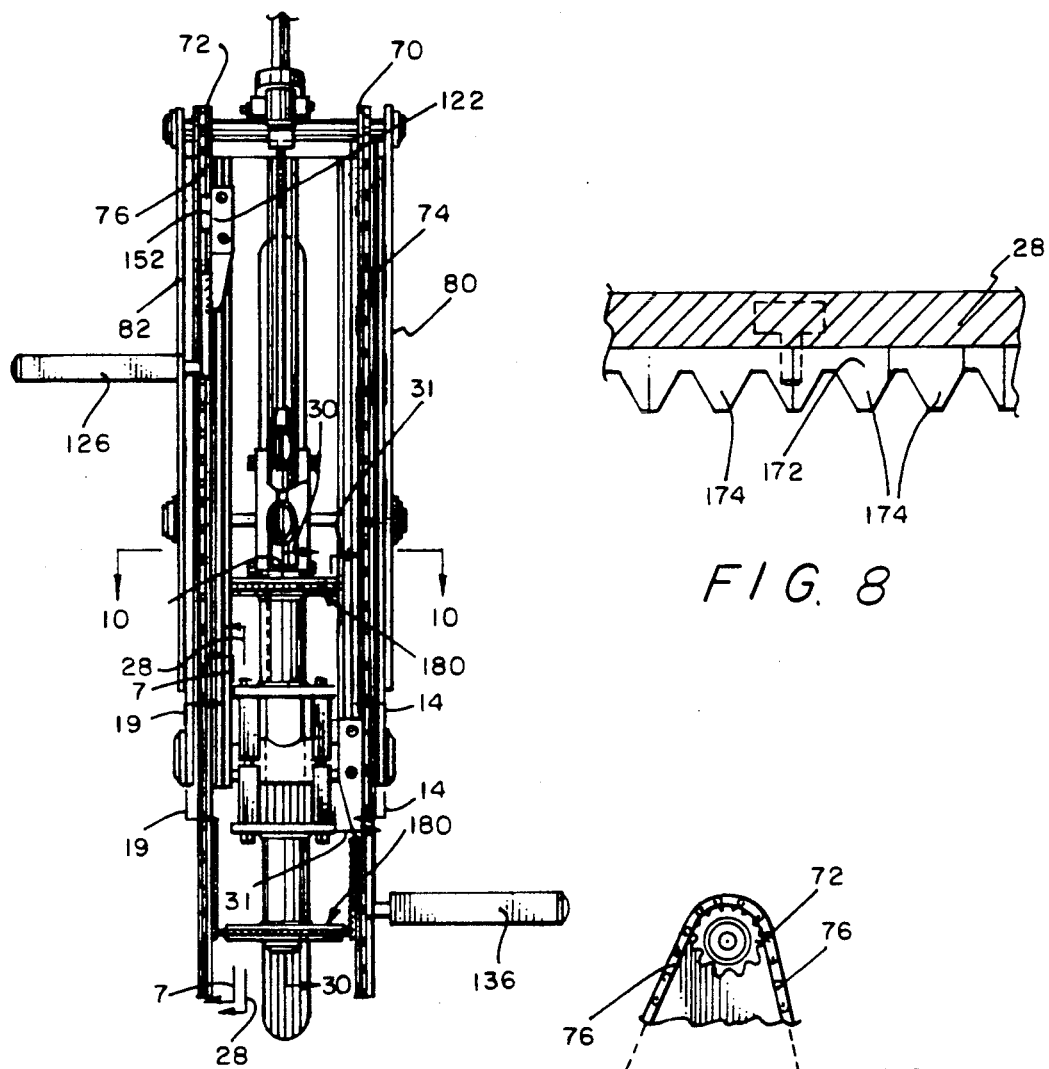
FIG. 6 is a partial vertical sectional view taken in direction of the arrows and along the plane of line 6—6 in FIG. 1
FIG. 7 is a vertical sectional view taken in direction of the arrows and along the plane of line 7—7 in FIG. 6.
FIG. 8 is a partial horizontal sectional view taken in direction of the arrows and along the plane of line 8—8 in FIG. 7, and more particularly disclosing a face gear.
Figure 9:
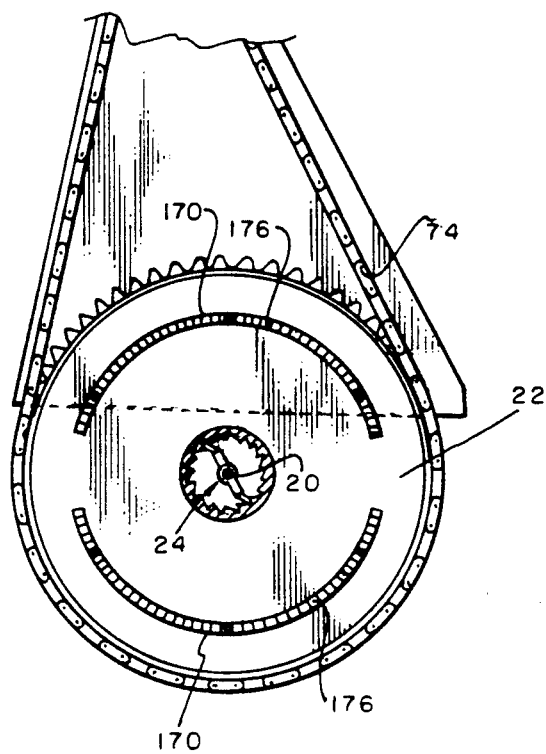
FIG. 9 is a side elevational view of a sprocket including a face gear secured thereto, and having an endless chain entrained thereover.
Figure 19:
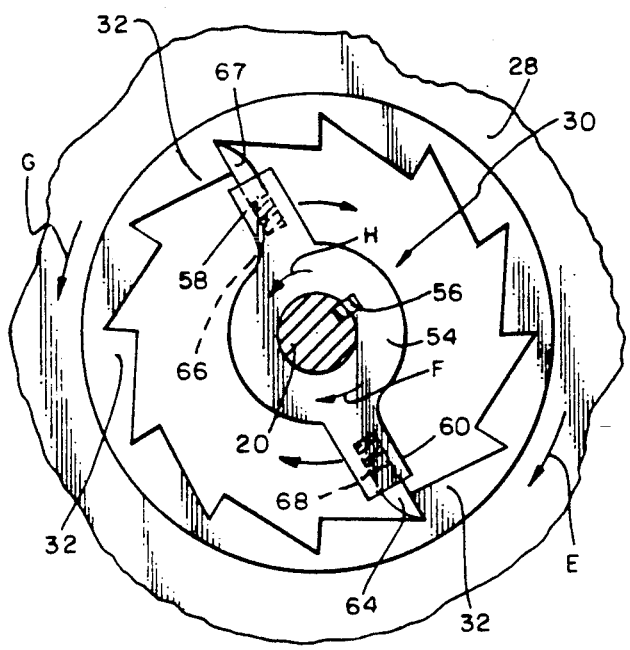
FIG. 19 is a partial vertical sectional view taken in direction of arrows and along the plane of line 19—19 in FIG. 6.

The apparatus 10 also comprises a second (or right) sprocket 28 coupled to the shaft 20 by a pawl member, generally illustrated as 30, which is keyed to or connected to the shaft 20 (see FIG. 19). More specifically, the sprocket 28 has teeth 32 which is firmly engaged by the pawl member 30 when the sprocket 28 is moved or rotated clockwise (i.e. the power stroke in direction of the arrow E in FIG. 19), with respect to the view in FIG. 19, in order to move and rotate the pawl member 30 and the shaft 20 also clockwise and in direction of the arrow F in FIG. 19. When the sprocket 28 is moved counterclockwise and in direction of the arrow G in FIG. 19 (as will be more particularly described below), the pawl member 30 ratchets over the teeth 32 in order to release or prevent the shaft 20 from being rotated counterclockwise and in direction of the arrow H in FIG. 19. As previously indicated, in a preferred embodiment for the invention, the shaft 20 is only rotated in a single direction, which is the direction of the arrow F in FIG. 19. It should be understood and is readily apparent that movement of the shaft 20 in direction of the arrow B in FIG. 14 is the same direction of the arrow F in FIG. 19. Similarly, movement of the shaft 20 in direction of the arrow F (the power stroke) in FIG. 19 is moving the shaft 20 in direction of the arrow B (also the power stroke) in FIG. 14. As best shown in FIG. 7, the second sprocket 28 has a periphery having a structure defining a plurality of teeth 28t.

Pawl member 24 has a pawl body 36, preferably round or cylindrical, wherethrough shaft 20 passes and is keyed thereto at 38 (See FIG. 14). Integrally formed with or bound integrally to the pawl body 36 is a generally hollow pawl arm 40, and a generally hollow pawl arm 42 which is opposed to pawl arm 40. A pawl tooth 44 and a pawl tooth 46 slidably pass into and lodge in the pawl arms 40 and 42 respectively. Pawl tooth 44 is biased outwardly by a spring 48 which is capable of retracting or collapsing when the sprocket 22 moves clockwise (i.e. in direction of arrow C in FIG. 14) such that the pawl tooth 44 slides or moves reciprocatively in the hollow arm 40 causing the ratcheting. Similarly, pawl tooth 46 is biased outwardly by a spring 50 which is also capable of retracting or collapsing, especially when the sprocket 22 moves clockwise such that the pawl tooth 46 slides or moves reciprocatively in the hollow arm 42, also causing the ratcheting. Reciprocating movement of the teeth 44 and 46 into and within the hollow arms 40 and 42 respectively occurs as the teeth 44 and 46 pass over and against the teeth 26 when the sprocket 22 moves clockwise, and is the ratcheting action or mechanism.

Pawl member 30 is identical to pawl member 24. More particularly, pawl member 30 has a pawl body 54, preferably round or cylindrical, wherethrough shaft 20 passes and is keyed thereto at 56 (See FIG. 19). A pair of generally hollow pawl arms 58 and 60 integrally connect to the pawl body 54 on opposed sides thereof. Pawl teeth 62 and 64 slidably pass into pawl arms 58 and 60 (similar to teeth 44 and 46 being slidably received by pawl arms 40 and 42) and are respectively biased outwardly by springs 66 and 68 which ar housed respectively by and into pawl arms 58 and 60. Spring 66 is capable of retracting or collapsing when the sprocket 28 moves counterclockwise (i.e. in direction of arrow G in FIG. 19) such that the pawl tooth 62 slides or moves reciprocatively in the hollow arm 58 causing ratcheting. Likewise, spring 68 is also capable of retracting or collapsing or compressing when the sprocket 28 moves counterclockwise and in direction of the arrow G such that the pawl tooth 64 reciprocately slides or moves in the hollow arm 60, also causing the ratcheting. Reciprocating movement of the teeth 62 and 64 into and within the hollow arms 58 and 60 respectively occurs as the teeth 62 and 64 pass over and against the teeth 32 when the sprocket 28 moves counterclockwise, and is the ratcheting action or mechanism.

Figure 17:
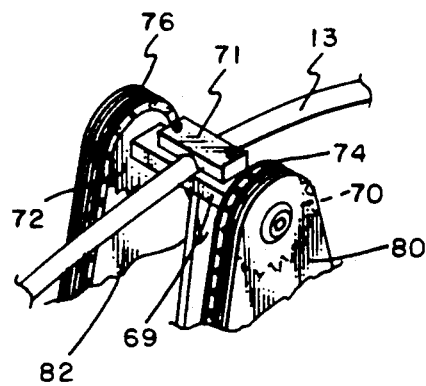
FIG. 17 is a partial perspective view of the pair of idler sprockets entrained to a pair of endless chains respectively.
Figure 18:
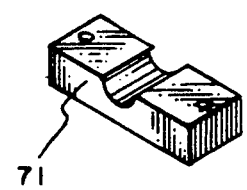
FIG. 18 is a perspective view of a bracket member employed to secure the pedal support and the guide assembly to the frame of the bicycle.

The apparatus 10 also includes a pair of idler sprockets 70 and 72 rotatably supported by the frame 13. As best shown in FIGS. 17 and 18 the idler sprockets 70 and 72 are rotatably supported by and to a support bracket 69 that is supported by the frame 13 through the employment of a clamp 71 that couples to the bracket 69 with the frame 13 therebetween. An endless chain 74 is entrained over the idler sprocket 70 and the first (or left) sprocket 22 to keep the chain 74 taut. Similarly, an endless chain 76 is entrained to or over the idler sprocket 72 and the second (or right) sprocket 28 to keep the chain 76 taut. Safety guards 80 and 82 may be conveniently disposed over the endless chains 74 and 76 respectively in a supporting relationship to or with the frame 13 to protect the legs of a would be user of the apparatus 10, more specifically of the bicycle 12. As the user of the bicycle 12 moves the sprockets 22 and 28 intermittently and alternatively clockwise and counterclockwise with a pair of pedals slidably engaged to a pair of pedal support and guide assemblies (all to be identified below), the endless chains 74 and 76 travel and/or are moved intermittently and alternatively clockwise and counterclockwise over the idler sprockets 70 and 72 respectively. As will be further explained below, clockwise and counterclockwise movement of the sprockets 22 and 28 is less than 180 degrees, more preferably from about 20 degrees to about 175 degrees, movement on each sprocket 70 and 72. When one of the sprockets (e.g. sprocket 22) is being moved in one direction, say about 170 degrees, the other sprocket (e.g. sprocket 28) is also being moved about 170 degrees. As will also be further explained below, movement of the sprocket 22 and 28 in any direction causes power to be transferred to the shaft 20.

The apparatus 10 further also comprises a first (or left) pedal support and guide assembly, generally illustrated as 90, and a second (or right) pedal support and guide assembly, generally illustrated as 92. As best shown in FIGS. 5, 12 and 13, and FIGS. 25 and 26 each of the pedal support and guide assemblies 90 and 92 are hollow channel members with a front longitudinal opening. More specifically, the first (or left) pedal support and guide assembly 90 comprises a rectangular upright back 94 having integrally formed therewith a pair of opposed sides 96-98 which terminate in a pair of opposed lips 100-102 respectively. The distance between opposed lips 100, 102 define a longitudinal opening 104 wherethrough a left pedal assembly, generally illustrated as 106, slidably passes such as to be able to move up and down therein. Similarly, the second (or right) pedal support and guide assembly 92 includes a rectangular upright back 108 having integrally formed therewith a pair of opposed sides 110-112 which terminate in a pair of opposed lips 114-116 respectively. The opposed lips 114 and 116, more specifically the space therebetween, define a longitudinal opening 118 wherethrough a right pedal assembly, generally illustrated as 120 (See FIG. 26) slidably passes in order to move up and down therein when operated by the user or operator. Both of the assemblies 90 and 92 are conveniently supported by a base plate 105 and have a roof 109. A bracket assembly 107 secures to sides 98 and 110 for interconnecting the assemblies 90 and 92 to the frame 13.

Figure 20:
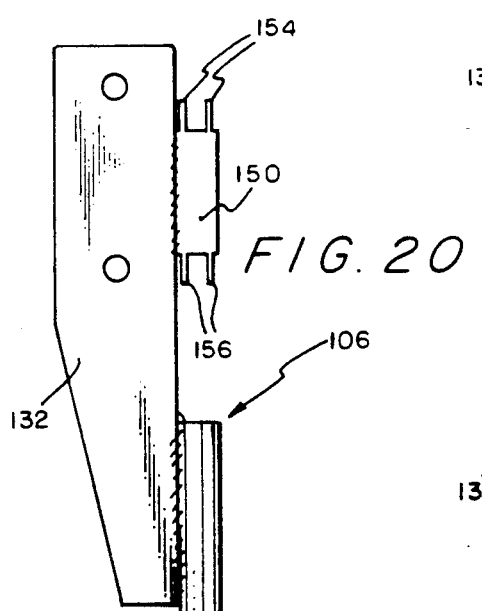
FIG. 20 is a front elevational view of the pedal bracket having secured thereto a pedal member and a link member that secures an endless chain to the pedal bracket.
Figure 22:
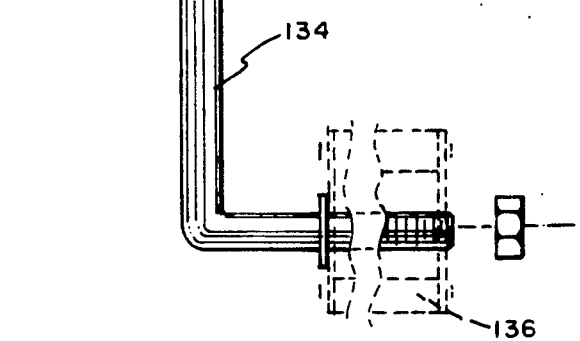
FIG. 22 is a bottom plane view of the pedal bracket and the pedal member of FIG. 20.
Figure 26:
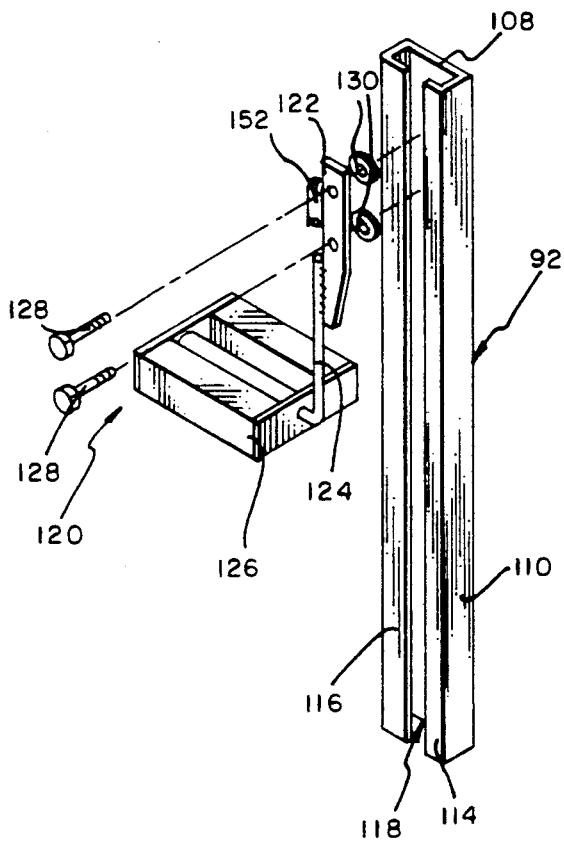
FIG. 26 is a perspective view of a channel member and the pedal member and the bearings employed to slidably engage the channel member such that the pedal member can be slid up and down within a channel of the channel member.
Figure 25:
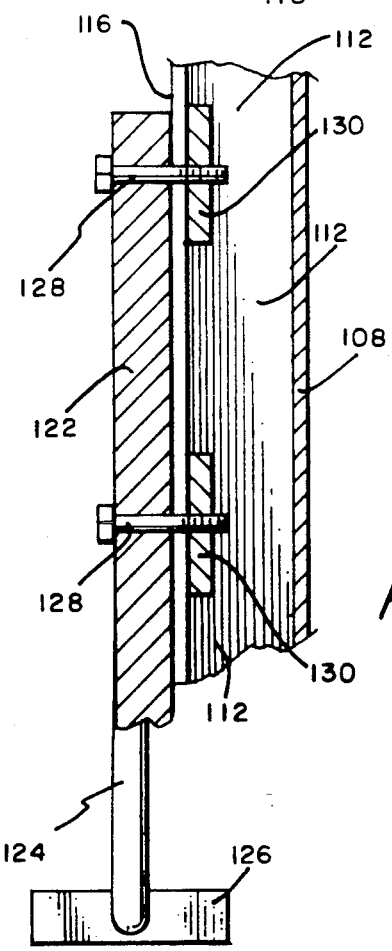
FIG. 25 is a partial vertical sectional view taken in direction of the arrows and along the plane of line 25—25 in FIG. 5.

The left pedal assembly 106 and the right pedal assembly 120 are essentially identical. More particularly as depicted in FIG. 26, the right pedal assembly 120 includes a right pedal bracket 122, and a L-shaped right pedal rod 124 secured thereto for rotatably supporting a pedal 126. A pair of bolts 128—128 pass through the bracket 122 and the opening 118 to connect a pair of generally round bearing members 130—130 which slidably lodge behind the opposed lips 114 and 116 and within the second (or right) pedal support and guide assembly 92. The bearing members 130—130 enable the right pedal assembly 120 to slidably move up and down and remain slidably engaged to the right pedal support and guide assembly 92. The left pedal assembly 106 (See FIGS. 5 and 20) includes a left pedal bracket 132, and a L-shaped left pedal rod 134 secured thereto for rotatably supporting a pedal 136. A pair of bolts 138—138 pass through the bracket 132 to attach or connect to a pair of generally round bearing members 140—140 (one bearing member 140 shown in FIG. 5). The bearing members 140—140 slidably lodge behind the opposed lips 100 and 102 and within the first (or left) pedal support and guide assembly 90. The bearing members 140—140 enable the left pedal assembly 106 to slidably move up and down and remain slidably engaged to the left pedal support and guide assembly 90.

Figure 21:
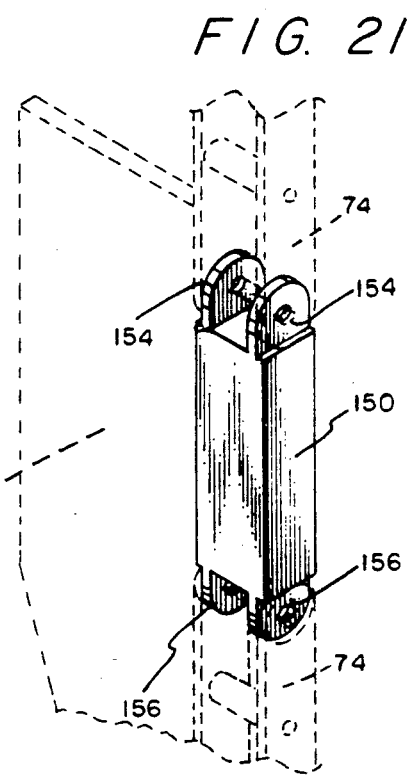
FIG. 21 is a perspective view of the link member.
Figure 27:
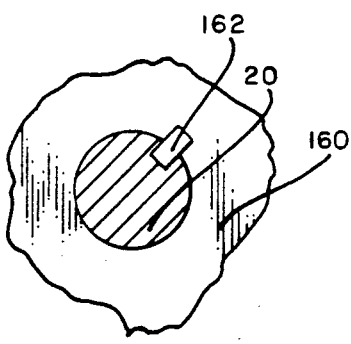
FIG. 27 is a partial vertical sectional view of the drive sprocket keyed to the shaft.
Figure 28:
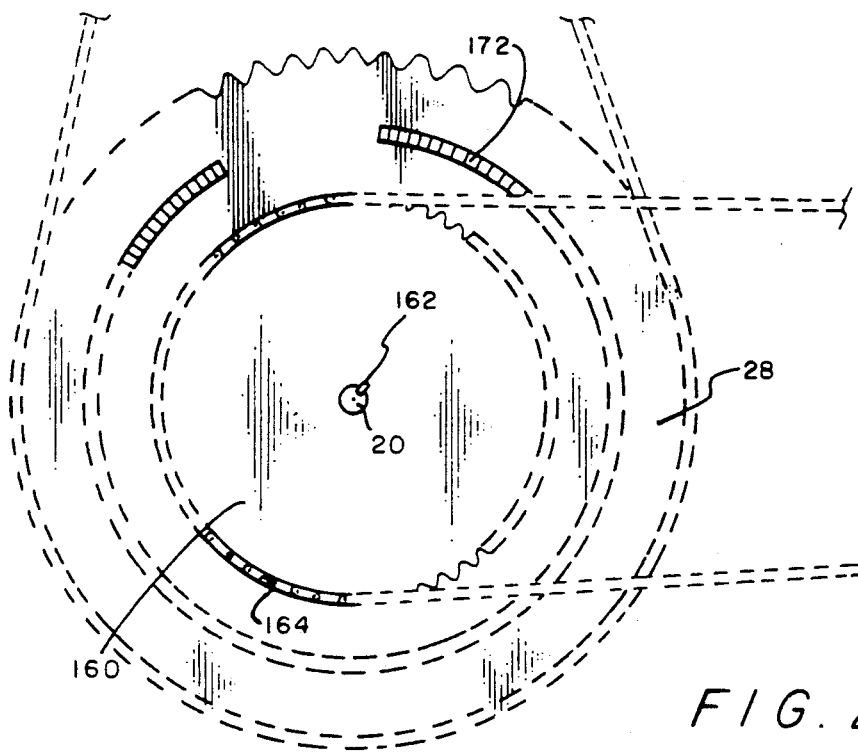
FIG. 28 is a partial vertical sectional view taken in direction of arrows and along the plane of line 28—28 in FIG. 6.
Figure 29:
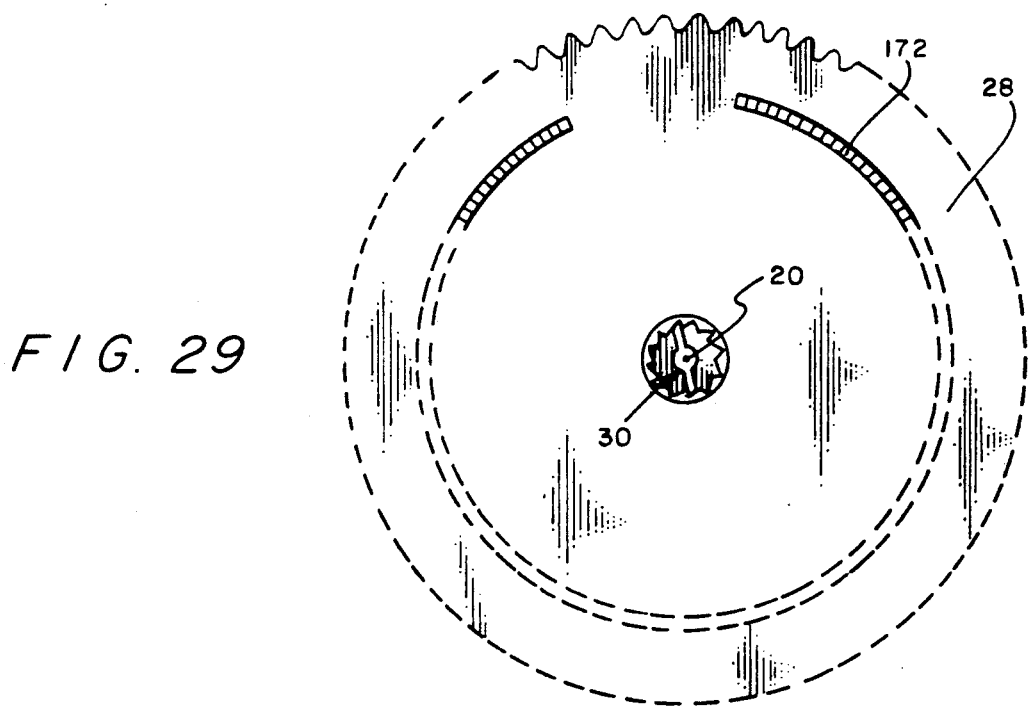
FIG. 29 is another side elevational view of a sprocket member having a face gear secured thereto.

The endless chains 74 and 76 are coupled to and/or connected to the left pedal assembly 106 and to the right pedal assembly 120 respectively through the use of a linkage mechanism, more particularly a left link member 150 is connected to the left pedal bracket 132 (See FIG. 20) and a right link member 152 (See FIG. 5) connects to the right pedal bracket 122. Link members 150 and 152 have the endless chains 74 and 76 connected respectively to opposed ends of each such that they form part of the endless chains 74 and 76. As best shown in FIG. 21, the left link member 150 has an opposed pair of a pair of lugs 154—154 and 156—156, with each having an opening as shown to assist in connecting the endless chain 74 thereto. The right link member 152 is identical to the left link member 150 and also has an opposed pair of a pair of lugs (not specifically shown) which are identical to lugs 154—154 and 156—156. The lugs of the right link member 152 also each have an opening to assist connecting the endless chain 76 thereto (See FIG. 6). Thus, the link members 150 and 152 provide a linkage mechanism from the left pedal bracket 132 and the right pedal bracket 122 respectively to the endless chains 74 and 76 such that when the operator moves the pedal assemblies 106 and 120 up and down the endless chains 74 and 76 respectively move to rotate the sprockets 22 and 28, which in turn, as previously indicated, move the shaft 20. When the apparatus 10 is to function as a bicycle 12, a drive sprocket 160 is keyed to the shaft 20 at 162 (See FIGS. 7 and 27) in order to move therewith and in rotational direction thereof. A drive chain 164 is entrained to and over the drive sprocket 160 and to and over the rear sprocket 18 (See FIGS. 1 and 7) to drive or otherwise rotate the rear sprocket 18 and move the bicycle 12 when the drive sprocket 160 is being rotated by the shaft 20.

Figure 11:
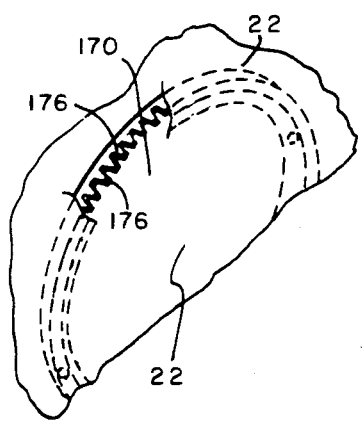
FIG. 11 is a partial perspective view of a sprocket member and having the face gear secured thereto.
Figure 10:
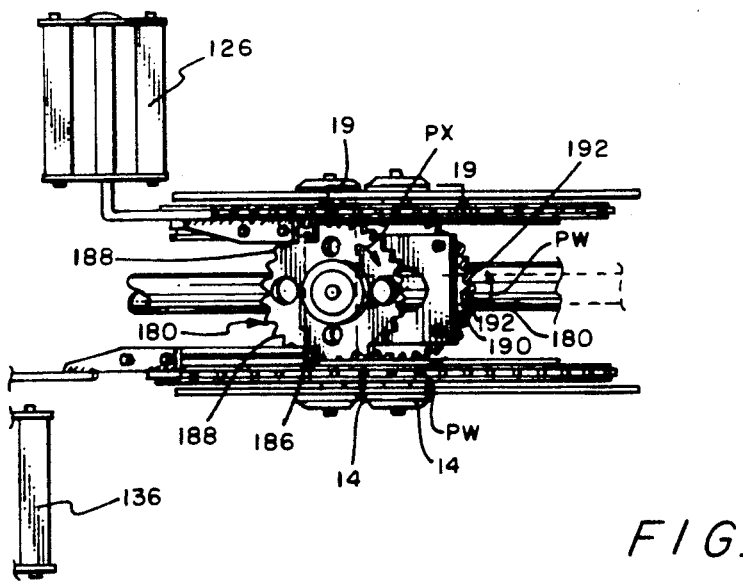
FIG. 10 is a horizontal view taken in direction of arrows and along the plane of 10—10 in FIG. 6, and more particularly disclosing the top planetary gear which is engaged to the face gears of the two sprocket members.
Figure 12:
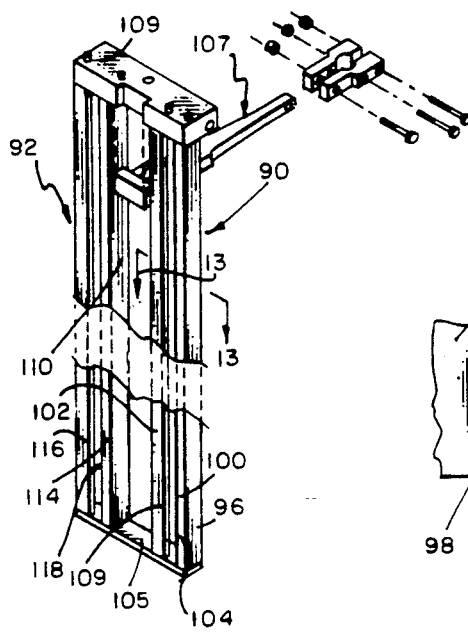
FIG. 12 is a perspective view of the pedal support and guide assembly.
Figure 13:
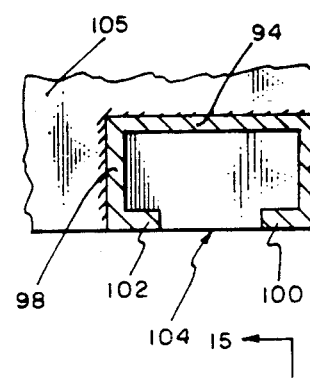
FIG. 13 is a horizontal sectional view taken in direction of arrows and along the plane of line 13—13 in FIG. 12.
Figure 15:
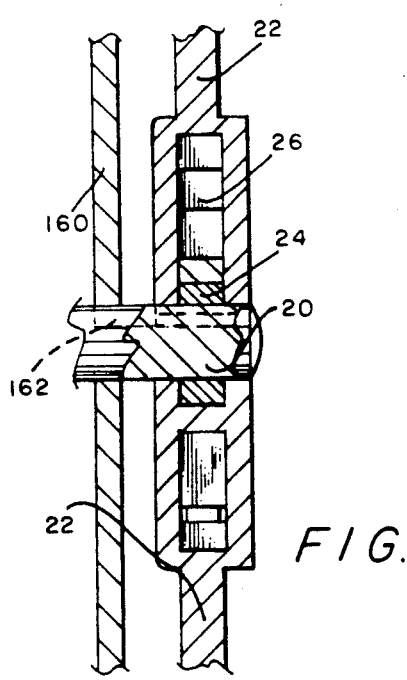
FIG. 15 is a vertical partial sectional view taken in direction of arrows and along the plane of line 15—15 in FIG. 14.
Figure 23:
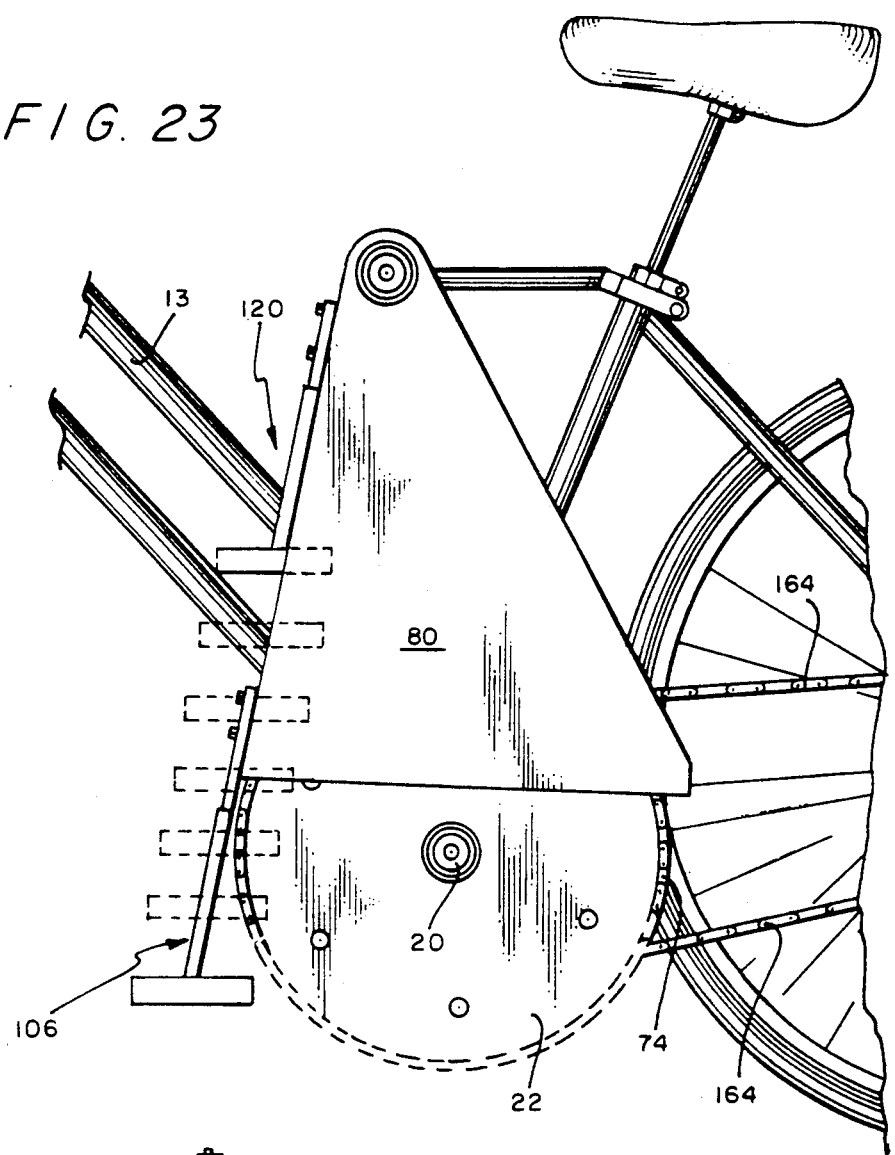
FIG. 23 is a side elevational view of the bicycle with the pedal movement being represented by dotted lines.
Figure 24:
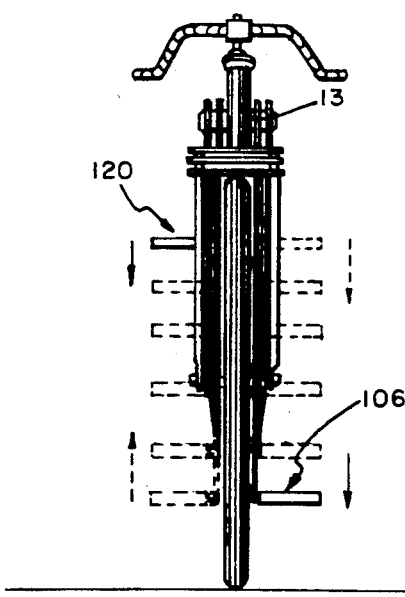
FIG. 24 is a front elevational view of the bicycle with the pedal movement being represented by dotted lines.
Figure 30:
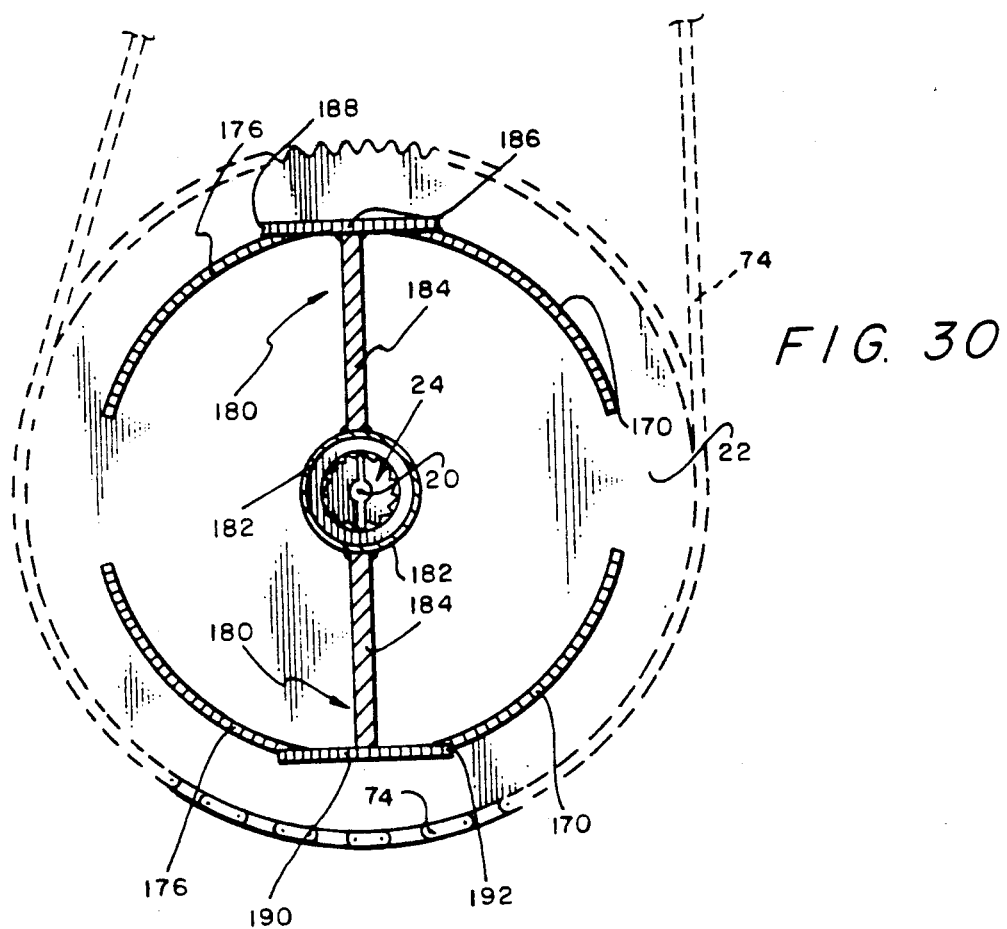
FIG. 30 is a partial vertical sectional view taken in direction of the arrows and along the plane of line 30—30 in FIG. 6.
Figure 31:
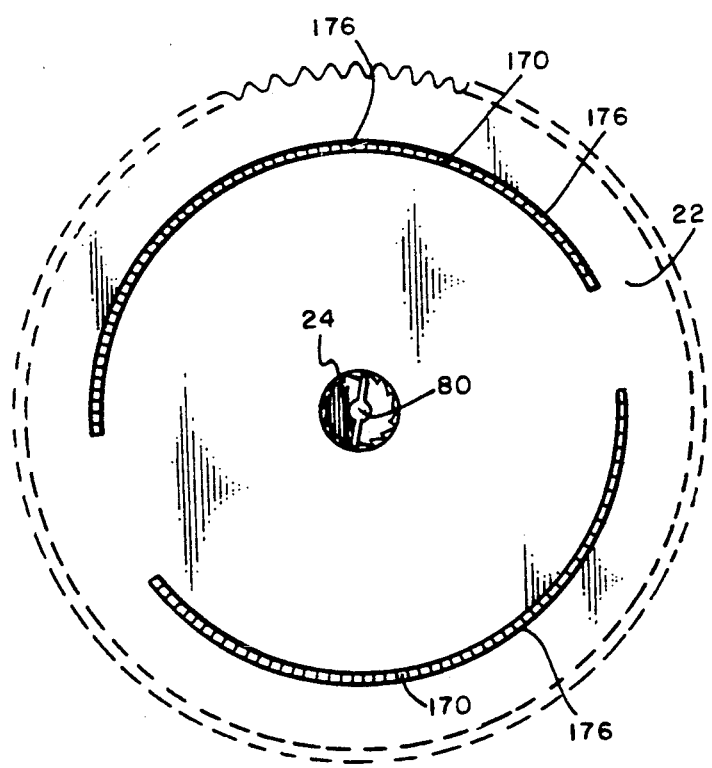
FIG. 31 is a partial vertical sectional view taken in direction of arrows and along the plane of line 31—31 in FIG. 6.

A face gear 170, more specifically a pair of face gears 170—170, is secured to the inside face of the first (or left) sprocket 22. Similarly, a face gear 172, more specifically a pair of face gears 172—172, is connected to the inside face of the second (or right) sprocket 28. Face gear 172, as best shown in FIGS. 7 and 8, has a plurality of teeth 174. Similarly, face gear 170 (which is generally identical to face gear 172) has a plurality of teeth 176 (See FIG. 11). The teeth 174 and 176 of face gears 172 and 170 respectively are engaged to and by at least one planetary gear, generally illustrated 180, preferably two planetary gears 180—180 as shown in FIGS. 10 and 6 and 30. The planetary gears 180 comprise a non-revolving planetary sleeve 182 which is supported by and may be a part of the frame 13; more specifically, by the frame 13 and the shaft 20 that rotates therethrough. Secured to the non-revolving planetary sleeve 182 is a pair of upright planetary supports 184—184. Rotatably connected to one upright planetary support 184 is a top circular planetary gear 186 having teeth 188 (See FIG. 10) which engage both of the teeth 174 and 176 of face gears 172 and 170 respectively. Rotatably connected to the other upright planetary support 184 is a lower circular planetary gear 190 having teeth 192 (See FIG. 10) which also engage both of the teeth 174 and 176 of face gears 172 and 170 respectively. As will be more fully explained below, the planetary gear 180 provides and insures that there is a power/mechanical leverage at all times with both pedal assemblies 106 and 120 (see FIGS. 23 and 24).

With continuing reference to the drawings for operation of the invention, an operator sits on the bicycle 12 and his or her legs engage the pedals 126 and 136 of the right and left pedal assemblies 120 and 106 respectively. The operator's feet may be strapped to pedals 126 and 136, similar to how a bike racer straps his for her feet to pedals. When the left pedal assembly 106 is pushed downwardly, the link member 150 (attached to both the pedal bracket 132 and the endless chain 74) causes the endless chain 74 to move down (or counterclockwise with respect to the view in FIGS. 4 and 23). Movement of the endless chain 74 down causes the first (or left) sprocket 22 and the idler sprocket 70 to move counterclockwise in the view of FIG. 4 or in direction of the arrow A in FIG. 14. When the sprocket 22 is moved or rotated counterclockwise or in direction of the arrow A in FIG. 14, the pawl member 24 firmly engages the teeth 26 of the sprocket 22 and moves the shaft 20 counterclockwise or in direction of the arrow B in FIG. 14. As previously indicated, any object or element keyed to the shaft 20, such as drive sprocket 160, also moves with the shaft 20. In the embodiment of the invention where the rotary power off or from shaft 20 in the apparatus 10 is to move a bicycle 12, the chain 164 extending from the drive sprocket 160 to the rear sprocket 18 causes the rear sprocket 18 to rotate and move the bicycle 12. Simultaneously with the left pedal assembly 106 moving downwardly, the right pedal assembly 120 is moving upwardly. When the right pedal assembly 120 is moving upwardly, the link member 152 (attached to both the pedal bracket 122 and the endless chain 76) causes the endless chain 76 to move up (or clockwise with respect to the view in FIG. 7). Movement of the endless chain 76 up causes the second (or right) sprocket 28 and the idler sprocket 72 to also move clockwise in the view of FIG. 7, or, stating it alternatively, when the endless chain 76 moves up and clockwise in FIG. 7, the second (or right) sprocket 28 moves counterclockwise and in direction of the arrow G in FIG. 19. When the sprocket 28 is moved counterclockwise and in direction of the arrow G in FIG. 19, the pawl member 30 ratchets over the teeth 32 in order to prevent the shaft 20 from being retarded in its clockwise rotation and to further prevent the shaft 20 from being rotated counterclockwise and in direction of the arrow H in FIG. 19. When the second (or right) sprocket 28 moves counterclockwise and in direction of the arrow G in FIG. 19, the top circular gear 186 (engaged to the face gear 172 connected to the inside face of the sprocket 28) moves clockwise with respect to the view in FIG. 10 or in direction of the arrow PX in FIG. 10. The lower gear 196 moves or is moving counterclockwise with respect to the view in FIG. 10 or in direction of the arrow PW in FIG. 10.

Movement of the top circular gear 186 clockwise or in direction of the arrow PX in FIG. 10 and movement of the lower circular gear 190 counterclockwise and in direction of the arrow PW in FIG. 10, further causes the first (or left) sprocket 22 to rotate counterclockwise in FIG. 14 or in direction of the arrow A in FIG. 14 since the sprocket 22 is coupled to the top and lower circular gears 186 and 190 via the face gears 170—170 secured to the inside face of the sprocket 22. Thus, movement of the endless chain 76 upwardly or clockwise in FIG. 7 and the movement of the sprocket 28 counterclockwise and in direction of the arrow G in FIG. 19, further assist and causes the sprocket 22 to be moved counterclockwise or in direction of the arrow A in FIG. 14 (the power stroke for the left pedal assembly 106). Thus, the power downward stroke for the left pedal assembly 106 is supplemented and/or aided by the upward stroke or movement of the right pedal assembly 120. Stated alternatively, the power downward stroke for the left pedal assembly 106 may be developed independently of any downward thrust by the operator on the left pedal assembly 106 by the upward movement of the right pedal assembly 120. Thus, the operator may develop the power downward stroke for the left pedal assembly 106 by not engaging the left pedal assembly 106 at all but by merely raising or elevating upwardly the right pedal assembly 120 (such as by the right foot of the operator being strapped to the pedal 126).

When the left pedal assembly 106 reaches the lowermost position the right pedal assembly 120 is in the uppermost position and the procedure may now be reversed to continue the rotation of the shaft 20 in counterclockwise direction or in direction of arrow B in FIG. 14; or in the clockwise direction or the direction of arrow F in FIG. 19. When the right pedal assembly 120 is pushed downwardly, the link member 152 (attached to both the pedal bracket 122 and the endless chain 76) cause the endless chain 76 to move down (or counterclockwise with respect to the view in FIG. 7). Movement of the endless chain 76 down causes the second (or right) sprocket 28 and the idler sprocket 72 to move counterclockwise in the view of FIG. 7. When the sprocket 28 is moved or rotated counterclockwise in FIG. 7 or clockwise and in direction of the arrow E in FIG. 19, the pawl member 30 firmly engages the teeth 32 of the sprocket 28 and moves the shaft 20 clockwise or in direction of the arrow F in FIG. 19. As previously indicated, movement of the shaft 20 in direction of the arrow F in FIG. 19 is moving the shaft 20 in direction of the arrow B in FIG. 14. Simultaneously with the right pedal assembly 120 moving downwardly, the left pedal assembly 106 is moving upwardly. When the left pedal assembly 106 is moving upwardly, the link member 150 (attached to both the pedal bracket 132 and the endless chain 74) causes the endless chain 74 to move up (or clockwise with respect to the view in FIG. 4). Movement of the endless chain 74 up causes the first (or left) sprocket 22 and the idler sprocket 70 to also move clockwise in the view of FIG. 4; or, stating it alternatively, when the endless chain 74 moves up and clockwise in FIG. 4, the first (or left) sprocket 22 moves counterclockwise and in direction of the arrow C in FIG. 14. When the sprocket 22 is moved clockwise and in direction of the arrow C in FIG. 14, the pawl member 24 ratchets over the teeth 26 in order to prevent the shaft 20 from being hindered in its counterclockwise rotation or in direction of arrow B in FIG. 14 (or in direction of arrow F in FIG. 19) and to further prevent the shaft 20 from being rotated in direction of the arrow H in FIG. 19. When the first (or left) sprocket 22 moves clockwise and direction of the arrow C in FIG. 14, the top circular gear 186 (engaged to the face gear 170 connected to the inside face of the sprocket 22) moves counterclockwise with respect to the view in FIG. 10 or in direction of the arrow PW in FIG. 10. The lower gear 196 moves or is moving clockwise with respect to the view in FIG. 10 or in direction of the arrrow PX in FIG. 10. Movement of the top circular gear 186 counterclockwise or in direction of the arrow PW in FIG. 10 and movement of the lower circular gear 190 clockwise and in direction of the arrow PX in FIG. 10, further causes the second (or right) sprocket 28 to rotate counterclockwise in FIG. 7 or in direction of the arrow E in FIG. 19 since the sprocket 28 is coupled to the top and lower circular gears 186 and 190 via the face gear 172-172 secured to the inside face of the sprocket 28. Thus, movement of the endless chain 74 upwardly or clockwise in FIG. 4 and the movement of the sprocket 22 clockwise in direction of the arrow C in FIG. 14 further assist and causes the sprocket 28 to be moved counterclockwise or in direction of the arrow E in FIG. 19 (the power stroke for the right pedal assembly 120). Thus, the power downward stroke for the right pedal assembly 120 is supplemented and/or aided by the upward stroke or movement of the left pedal assembly 106. Stated alternatively, the power downward stroke for the right pedal assembly 120 may be developed independently of any downward thrust by the operator on the right pedal assembly 120 by the upward movement of the left pedal assembly 106. Thus, the operator may develop the power downward stroke for the right pedal assembly 120 by not engaging the right pedal assembly 120 at all but by merely raising or elevating upwardly the left pedal assembly 106 (such as by the left foot of the operator being strapped to the pedal 136). Thus, the planetary gear 180, more specifically the top and lower circular gears 186 and 190 engaged to face gears 170—170 and 172—172 of sprockets 22 and 28, provides and insures that there is a power/mechanical leverage and/or rotation at all times on shaft 20, regardless of the direction of travel of the pedal assemblies 106 and 120. Stated alternatively when the left and right pedal assemblies 106 and 120 are travelling or being moved upwardly or downwardly there will be rotary power imparted to the shaft 20 at all times through the employment of the planetary gear 180. The downward movement of the left pedal assembly 106 and/or the upward movement of the right pedal assembly 120 imports rotary power to the shaft 20. Similarly, the upward movement of the left pedal assembly 106 and/or the downward movement of the right pedal assembly 120 also imparts rotary power to the shaft 20.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. An apparatus for providing rotary power to move a device comprising:
   (a) a frame;
   (b) a shaft means rotatably supported by said frame for being rotated in a predetermined direction;

(c) a first sprocket coupled to the shaft means for rotating the same in the predetermined direction; said first sprocket comprises a first inside face and a first circular periphery having a structure defining a plurality of first sprocket teeth, at least one first face gear secured directly to the first inside face of said first sprocket, and said first face gear comprises a plurality of first face gear teeth;

(d) a second sprocket coupled to the shaft means for rotating the same in the predetermined direction; said second sprocket comprises a second inside face and a second circular periphery having a structure defining a plurality of second sprocket teeth, at least one second face gear secured directly to the second inside face of said second sprocket, and said second face gear comprises a plurality of second face gear teeth;

(e) a first means, engaged to the first sprocket, for providing a support to an imposed force for rotating the first sprocket intermittently and alternatively clockwise and counterclockwise;

(f) a second means, engaged to the second sprocket, for providing a support to an imposed force for rotating the second sprocket intermittently and alternatively clockwise and counterclockwise; and (g) at least one planetary gear member rotatably engaged to said first face gear and to said second face gear and supported by said frame such that rotary force can be transferred from the first sprocket to the second sprocket and vice versa when the first sprocket and the second sprocket are rotating the shaft means in the predetermined direction.

2. The apparatus of claim 1 additionally comprises a drive sprocket connected to said shaft means for rotating in said predetermined direction.

3. The apparatus of claim 1 additionally comprises a first pawl member connected to said shaft means and coupled to said first sprocket for ratcheting therewith and for rotating the shaft means in the predetermined direction; and a second pawl member connected to the shaft means and coupled to said second sprocket for ratcheting therewith and for rotating the shaft means in the predetermined direction.

4. The apparatus of claim 1 wherein said first means comprises a first endless chain member entrained to said first sprocket teeth, a first channel member supported by said frame; a first pedal bracket slidably coupled to said first channel member and coupled to said first endless chain member; and a first pedal member connected to said pedal bracket.

5. The apparatus of claim 1 wherein said at least one planetary gear member comprises a non-revolving planetary sleeve supported by said frame; a first planetary support and a second planetary support both secured to said non-revolving planetary sleeve; and a first circular planetary gear rotatably connected to said first planetary support and engaging said first and said second face gear; and a second circular planetary gear rotatably connected to said second planetary support and engaging said first and said second face gear.

6. A bicycle comprising:

(a) a frame rotatably supported by a front wheel and a rear wheel;

(b) a shaft rotatably mounted to the frame;

(c) a first pawl member connected to the shaft;

(d) a second pawl member connected to the shaft;

(e) a first sprocket coupled to the first pawl member for ratcheting therewith and for rotating the shaft in a predetermined direction; said first sprocket comprises a first inside face and a first circular periphery having a structure defining a plurality of first sprocket teeth, at least one first face gear secured directly to the first inside face of said first sprocket, and said first face gear comprises a plurality of first face gear teeth;

(f) a second sprocket coupled to the second pawl member for ratcheting therewith and for rotating the shaft in the predetermined direction; said second sprocket comprises a second inside face and a second circular periphery having a structure defining a plurality of second sprocket teeth, at least one second face gear secured directly to the second inside face of said second sprocket, and said second face gear comprises a plurality of second face gear teeth;

(g) a first idler sprocket rotatably supported by the frame;

(h) a second idler sprocket rotatably supported by the frame;

(i) a first endless chain entrained over said first sprocket teeth and said first idler sprocket;

(j) a second endless chain entrained over said second sprocket teeth and said second idler sprocket;

(k) a drive sprocket connected to said shaft;

(l) an endless drive chain entrained to said drive sprocket and coupled to the rear wheel;

(m) a first pedal support and guide assembly supported by said frame;

(n) a second pedal support and guide assembly supported by said frame;

(o) a first pedal member slidably engaged to said first pedal support and guide assembly and coupled to said first endless chain; and (p) a second pedal member slidably engaged to said second pedal support and guide assembly and coupled to said second endless chain.

7. The bicycle of claim 6 additionally comprising at least one planetary gear member rotatably engaged to said first gear teeth and to said second gear teeth and supported by said frame such that rotary force can be transferred from the first sprocket to the second sprocket and vice versa when the first sprocket and the second sprocket are rotating the shaft in the predetermined direction.

8. The apparatus of claim 7 wherein said first endless chain comprises a first link member, and said first pedal bracket connects to said first link member.

9. The apparatus of claim 8 additionally comprising at least one first bearing member slidably disposed in said first channel member and connected to said first pedal bracket.

10. The bicycle of claim 7 wherein said first pedal support and guide assembly comprises a first channel member; a first bearing member slidably disposed in said first channel member; a first pedal bracket coupled to said first bearing member and coupled to first endless chain member, said first pedal member being connected to said first pedal bracket.

11. The bicycle of claim 10 wherein said first endless chain comprises a first link member, and said first pedal bracket connects to said first link member.

12. The bicycle of claim 11 wherein said second pedal support and guide assembly comprises a second channel member; a second bearing member slidably disposed in said second channel member; a second pedal bracket coupled to said second bearing member and coupled to said second endless chain member, said second pedal member being connected to said second pedal bracket; and said second endless chain comprises a second link member and said second pedal bracket connects to said second link member.

13. The bicycle of claim 7 wherein said at least one planetary gear member comprises a non-revolving planetary sleeve supported by said frame; a first planetary support and a second planetary support both secured to said non-revolving planetary sleeve; and a first circular planetary gear rotatably connected to said first planetary support and engaging said first and said second face gear; and a second circular planetary gear rotatably connected to said second planetary support and engaging said first and said second face gear.

14. A method for providing rotary power to a device comprising the steps of:

(a) providing a frame having a shaft rotatably secured thereto for being rotated in a predetermined direction;

(b) securing a drive sprocket to the shaft;

(c) providing a first sprocket comprising a first inside face and a first circular periphery having a structure defining a plurality of first sprocket teeth, at least one first face gear secured directly to the first inside face of said first sprocket, and said first face gear comprises a plurality of first face gear teeth;

(d) providing a second sprocket comprising a second inside face and a second circular periphery having a structure defining a plurality of second sprocket teeth, at least one second face gear secured directly to the second inside face of said second sprocket, and said second face gear comprises a plurality of second face gear teeth;

(e) coupling said first sprocket to the shaft for rotating the same in a predetermined direction;

(f) coupling said second sprocket to the shaft for rotating the same in a predetermined direction and said coupling of said second sprocket is such that said drive sprocket is between said first and second sprocket;

(g) rotating the first sprocket intermittently and alternatively clockwise and counterclockwise to rotate the shaft and the drive sprocket in the predetermined direction such that the drive sprocket can provide rotary power; and (h) rotating the second sprocket intermittently and alternatively clockwise and counterclockwise to rotate the shaft and the drive sprocket in the predetermined direction such that the drive sprocket can provide rotary power.

* * * * *